United States Patent [19]

Coursin

[11] Patent Number: 4,838,833
[45] Date of Patent: Jun. 13, 1989

[54] FIBER REINFORCED RESIN DRIVE SHAFT HAVING IMPROVED RESISTANCE TO TORSIONAL BUCKLING

[75] Inventor: Benjamin E. Coursin, Milwaukee, Wis.

[73] Assignee: A. O. Smith Corporation, Milwaukee, Wis.

[21] Appl. No.: 897,041

[22] Filed: Aug. 15, 1986

[51] Int. Cl.⁴ ............................................... F16C 1/02
[52] U.S. Cl. ..................................... 464/181; 464/183
[58] Field of Search ........................ 464/181, 182, 183

[56] References Cited

U.S. PATENT DOCUMENTS

| | | | |
|---|---|---|---|
| 4,171,626 | 10/1979 | Yates et al. | 464/181 |
| 4,238,540 | 12/1980 | Yates et al. | 464/181 X |
| 4,248,062 | 2/1981 | McLain et al. | 464/181 |
| 4,259,382 | 3/1981 | Schwan | 464/181 X |
| 4,272,971 | 6/1981 | Loyd et al. | 464/181 |
| 4,362,521 | 12/1982 | Puck et al. | 464/183 X |

FOREIGN PATENT DOCUMENTS 2138921  10/1984  United Kingdom ................ 464/181

Primary Examiner—Daniel P. Stodola
Attorney, Agent, or Firm—Andrus, Sceales, Starke & Sawall

[57] ABSTRACT

A fiber reinforced resin drive shaft for use in a vehicle and having improved resistance to torsional buckling. The drive shaft includes a tubular member composed of a thermosetting resin reinforced with fibrous material which consists of a mixture of substantially continuous glass and graphite fibers. A rib is integrally connected to the tubular member and extends radially from the member. The rib extends only a portion of the length of the member and has a thickness sufficient to substantially increase the resistance of the tubular member to torsional buckling.

8 Claims, 1 Drawing Sheet

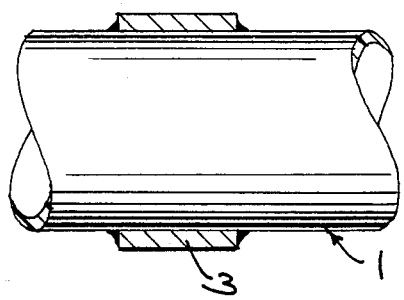
FIG. 2
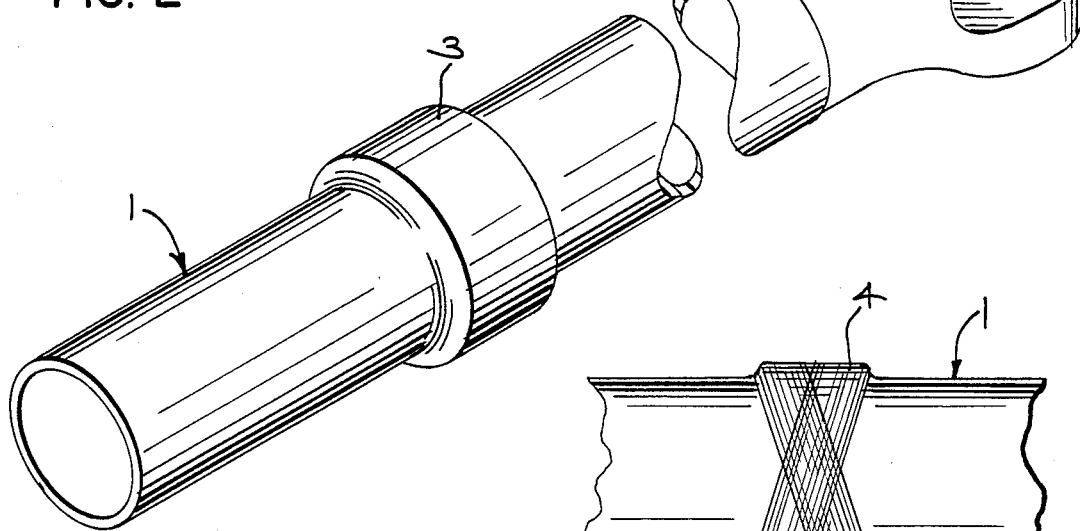
FIG. 1
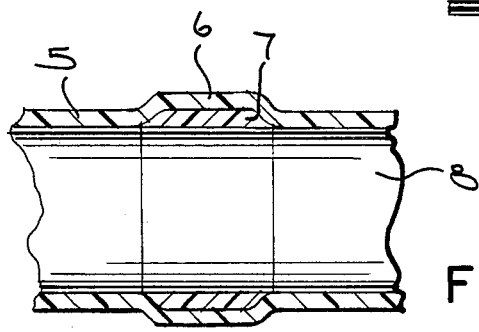
FIG. 3
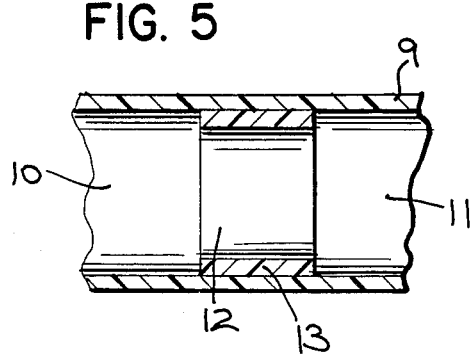
FIG. 4
FIG. 5
FIG. 6
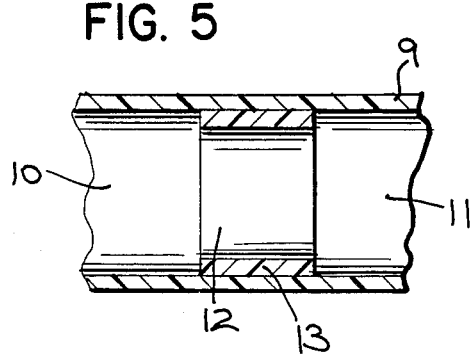
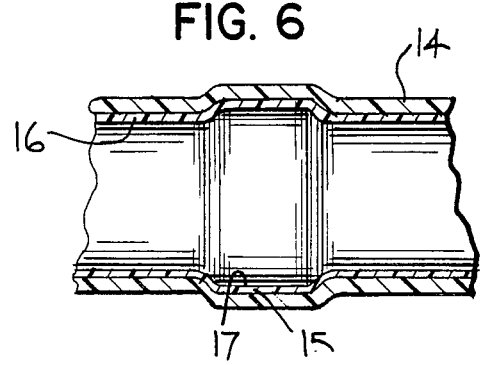

FIBER REINFORCED RESIN DRIVE SHAFT HAVING IMPROVED RESISTANCE TO TORSIONAL BUCKLING

BACKGROUND OF THE INVENTION

Vehicle drive shafts are employed to connect the universal joints at the front and rear of the vehicle. In the past, the drive shaft has commonly been formed of a steel tube having yokes connected at its ends. More recently, to reduce the overall weight of the vehicle, drive shafts have been made of fiber reinforced resin with the fibrous material consisting primarily of glass and graphite fibers. Graphite fibers have the advantage of providing stiffness in the longitudinal direction but are more expensive than glass.

In the design of a drive shaft it is necessary that the longitudinal bending mode be above a certain frequency. If it is not above this frequency, vibrations can occur and result in possible failure of the drive shaft.

As a further requirement, the drive shaft must be capable of carrying the torque of the engine without shear or torsional failure. If the drive shaft is not capable of carrying the engine torque, torsional buckling can occur which results in a deformation of the cross-section of the drive shaft and then a collapse and failure of the shaft at a given maximum torque.

Torsional buckling is more prevalent on longer length drive shafts which can, in some instances, be in the neighborhood of 90 to 100 inches. Torsional buckling can be prevented by incorporating additional quantities of graphite fibers to increase the longitudinal stiffness, but this substantially increases the overall cost of the drive shaft. A second manner of preventing torsional buckling is to construct the drive shaft in shorter lengths which are supported by intermediate bearings. Again the use of bearings contributes to the overall cost of the drive shaft.

Thus, there has been a need for an inexpensive, fiber reinforced resin drive shaft having increased resistance to torsional buckling.

SUMMARY OF THE INVENTION

The invention is directed to an improved drive shaft for a vehicle composed of fiber reinforced resin. In accordance with the invention, an annular rib is intergrally connected to the drive shaft and extends radially from the shaft. The rib extends only a portion of the length of the shaft and has a thickness sufficient to substantially reduce torsional buckling of the shaft.

In one form of the invention, the rib can take the form of a separate ring of metal or fibrous material, impregnated with a thermosetting resin, and bonded to the outer surface of the drive shaft.

In a second form of the invention, the rib can take the form of a ring located on the inner surface of the drive shaft, while in a further form of the invention, the fibrous material of the drive shaft can be wound over a projecting rib on a mandrel to form a corresponding outwardly extending rib on the shaft.

Through use of the invention, a substantial increase in resistance to torsional buckling is obtained without the need of adding additional graphite fibers which substantially increase the overall cost of the shaft.

Other objects and advantages will appear in the course of the following description.

DESCRIPTION OF THE DRAWINGS

The drawings illustrate the best mode presently contemplated of carrying out the invention.

In the drawings:

FIG. 1 is a prospective view of the drive shaft of the invention;

FIG. 2 is a fragmentary side elevation of the drive shaft with parts broken away in section;

FIG. 3 is a side elevation of a modified form of the invention, in which fibrous material is utilized to form an external rib;

FIG. 4 is a longitudinal section of a second modified form of the invention;

FIG. 5 is a longitudinal section of a further modified form of the invention; and FIG. 6 is a longitudinal section of a further modified form of the invention.

DESCRIPTION OF THE ILLUSTRATED EMBODIMENT

Referring particularly to FIGS. 1 and 2, a drive shaft 1 for a vehicle is illustrated which is connected at its ends to yokes or end fittings 2, only one of which is shown in FIG. 1. The drive shaft 1 is formed of fiber reinforced thermosetting resin, while the end fittings 2 are generally formed of steel or aluminum and the ends of the shaft 1 can be bonded around the sleeve portion of the end fittings 2 in any conventional manner.

Various types of fibrous material may be utilized to form drive shaft 1 and it has been found that a combination of glass and graphite fibers with the graphite is particularly suitable. When using a combination of glass and graphite fibers, the graphite fibers will preferably comprise from about 20% to 60% by weight of the fibrous material.

The thermosetting resin can be any resin commonly used in filament winding operations, such as an epoxy or polyester resin.

The fibers are in the form of substantially continuous strands which are wound helically in a plurality of superimposed layers or passes to provide the desired thickness for the drive shaft. The fibers can be wound in a variety of different patterns or helix angles depending on the nature of the fibrous material and the desired physical properties in the drive shaft. It has been found that a helix angle of about 15° is preferred to provide optimum longitudinal stiffness for the drive shaft.

In accordance with the invention, the resistance to the torsional buckling is substantially improved by incorporating one or more annular ribs or rings 3 on shaft 1. As shown in FIGS. 1 and 2, ring 3 is substantially continuous and can be formed of metal, such as aluminum, or alternately can be formed of fiber reinforced resin. Ring 3 can be bonded to the outer surface of shaft 1 through use of a suitable adhesive, or alternatively, additional layers of fibrous material impregnated with a thermosetting resin can be wound over ring 3 to bond the ring to the outer surface of shaft 1.

FIG. 3 shows a modified form of the invention in which a series of helical windings 4 of a fibrous material impregnated with a thermosetting resin are wound over the outer surface of shaft 1 to provide an outwardly extending rib. The fibrous material can be glass or any other fibrous material commonly used in filament winding operations and is wound in a number of superimposed layers to provide a rib which generally has a thickness greater than the wall thickness of shaft 1. On curing of the resin, the windings 4 will be integrally bonded to shaft 1.

FIG. 4 illustrates a further modified form of the invention in which a drive shaft 5, similar to drive shaft 1 of the first embodiment, is provided with an outwardly extending circumferential rib 6. To form rib 6, a ring 7 formed of metal, plastic or other material, is inserted around a cylindrical mandrel 8 and fibrous strands impregnated with thermosetting resin are then wound in a plurality of superimposed layers over ring 7 to form the shaft 5 with outwardly projecting rib 6. At the completion of the winding operation, the mandrel 8 is removed to provide a structure in which ring 7 is integrally bonded to the inner surface of drive shaft 5.

A further modification of the invention is shown in FIG. 5. In this embodiment a drive shaft 9, similar in structure to drive shaft 1, is provided with an internal rib which extends inwardly from the inner surface of the shaft 9.

To form the structure shown in FIG. 5, a two-piece mandrel assembly is employed comprising mandrel sections 10 and 11. The end of mandrel section 11 is provided with a smaller diameter extension 12 which abuts the end of mandrel 10. A ring 13 of metal, plastic or fiber reinforced resin, is inserted around the extension 12 and the mandrels are then positioned in abutting relation, as shown in FIG. 5. Fibrous material impregnated with a thermosetting resin is then wound in a number of superimposed layers over the mandrel sections 10 and 11, as well as over the ring 13, to provide the drive shaft structure as shown in FIG. 5. On removal of mandrel sections 10 and 11 from the shaft 9, the ring 13 will be integrally bonded to the inner surface of shaft 9 to constitute the rib.

FIG. 6 is a further modified form of the invention including a drive shaft 14, similar in structure to drive shaft 1, which is provided with an outwardly extending circumferential rib 15. To form the construction shown in FIG. 6, a tube 16, preferably formed of thermoplastic material and having an annular rib or protrusion 17, is utilized as a mandrel and fibrous strands impregnated with resin are wound in a number of superimposed layers over the tube 16 and protrusion 17 to form drive shaft 14.

The rib formed either on the external or internal surface of the fiber reinforced resin drive shaft substantially increases the resistance to torsional buckling. The rib can be located anywhere along the length of the shaft, and depending upon the length of shaft, one or more ribs can be utilized. It is preferred to position the rib in a position where it will not affect the frequency of the longitudinal bending mode so that excessive vibrations will not result.

Preferably the rib has a thickness greater than the wall thickness of the drive shaft. As an example, a fiber reinforced epoxy resin drive shaft in which the fiber reinforcement is composed by weight of 37% glass fibers and, 26% graphite fibers, was produced having a length of 70 inches, a wal of thickness of 0.100 inches and a rib thickness of 0.150 inches. With this construction an increase of approximately 25% in resistance to torsional buckling was obtained over a similarly constructed shaft but without the rib.

Various modes of carrying out the invention are contemplated as being within the scope of the following claims particulary pointing out and distinctly claiming the subject matter which is regarded as the invention.

I claim:

1. A drive shaft, comprising a pair of end fittings, a continuous uninterrupted shaft connecting the end fittings and composed of fiber reinforced thermosetting resin, said shaft having a substantially uniform diameter throughout its length, the ends of said shaft being secured in lapping relation with the respective end fittings to provide lapping joints therebetween, an annular rib integrally connected to said shaft and extending radially of said shaft, said rib being spaced longitudinally of said lapping joints and having a radial thickness sufficient to increase the resistance of the shaft to torsional buckling.

2. The drive shaft of claim 1, wherein said fiber reinforcement comprises a combination of glass and graphite fibers.

3. The drive shaft of claim 1, wherein the thickness of the rib is greater than the wall thickness of said shaft.

4. The drive shaft of claim 1, wherein said rib is composed of fibrous material bonded by a thermosetting resin.

5. The drive shaft of claim 1, wherein said rib is a metal ring bonded to said shaft.

6. The drive shaft of claim 1, wherein said rib extends radially outward from said shaft.

7. The drive shaft of claim 1, wherein said rib extends radially inward from said shaft.

8. A drive shaft, comprising a pair of end fittings, a continuous uninterrupted shaft connecting said end fittings and composed of fibrous material bonded by a thermosetting resin, said shaft having a substantially uniform diameter throughout its length, the ends of said shaft being bonded around the ends of the repective end fittings to provide lapping joints therebetween, said fibrous material comprising a mixture of substantially continuous glass fibers and graphite fibers, a circumferential rib integrally formed with said shaft and extending radially of said shaft, said rib being spaced longitudinally of said lapping joints, said rib extending only a portion of the length of said shaft and having a thickness greater than the wall thickness of said shaft to thereby substantially increase the resistance of said shaft to torsional buckling.

* * * * *